US009642471B2

(12) United States Patent
Curós Santaeularia et al.

(10) Patent No.: US 9,642,471 B2
(45) Date of Patent: May 9, 2017

(54) FLAME-RETARDANT WATERPROOF STRETCHABLE COMPOSITE FABRIC, PILLOW OR MATTRESS PROTECTOR USING SAID FABRIC AND USE OF SAID FABRIC AS A PROTECTIVE SCREEN

(71) Applicant: MANUFACTURES INDUSTRIALS DE TORTELLA S.A., Tortella (ES)

(72) Inventors: Joan Curós Santaeularia, Olt (ES); Laura Rigau Roca, Olot (ES)

(73) Assignee: MANUFACTURES INDUSTRIALS DE TORTELLA, SA, Tortella (Girona) (ES)

( * ) Notice: Subject to any disclaimer, the term of this patent is extended or adjusted under 35 U.S.C. 154(b) by 534 days.

(21) Appl. No.: 14/350,131

(22) PCT Filed: Jan. 8, 2013

(86) PCT No.: PCT/IB2013/000023
§ 371 (c)(1),
(2) Date: Apr. 7, 2014

(87) PCT Pub. No.: WO2013/104975
PCT Pub. Date: Jul. 18, 2013

(65) Prior Publication Data
US 2014/0248481 A1    Sep. 4, 2014

(30) Foreign Application Priority Data
Jan. 10, 2012    (EP) .................................... 12380001

(51) Int. Cl.
*B32B 27/12*    (2006.01)
*B32B 5/02*    (2006.01)
(Continued)

(52) U.S. Cl.
CPC ........ *A47C 31/001* (2013.01); *A41D 31/0022* (2013.01); *A47C 31/105* (2013.01);
(Continued)

(58) Field of Classification Search
CPC ...... A41D 31/0022; B32B 5/02; B32B 5/026; B32B 5/04; B32B 23/08; B32B 27/06; B32B 27/12; B32B 27/18; D02G 3/443
(Continued)

(56) References Cited

U.S. PATENT DOCUMENTS 4,211,813 A    7/1980    Gravisse et al.
4,513,042 A    4/1985    Lumb
(Continued)

FOREIGN PATENT DOCUMENTS

EP    1 412 213 A1    4/2004
FR    2 846 202 A1    4/2004
(Continued)

OTHER PUBLICATIONS

International Search Report for PCT/IB2013/000023 mailed May 27, 2013.

*Primary Examiner* — Jenna Johnson
(74) *Attorney, Agent, or Firm* — RatnerPrestia

(57) ABSTRACT

The composite fabric is suitable as a flame barrier for different articles, such as mattresses, pillows, seats and upholstered furniture and is made from a plurality of joined breathable layers including at least one textile layer and one impervious layer joined including a knitted textile layer made of cellulose fibers of natural renewable origin including at least 50% of cellulose flame-retardant fibers, and the impervious layer including an halogen free plastic material selected among polyurethane or polyester incorporating a known flame-retardant or inhibitor additive.

17 Claims, 1 Drawing Sheet

(51) Int. Cl.

| | |
|---|---|
| *B32B 27/18* | (2006.01) |
| *D02G 3/44* | (2006.01) |
| *A41D 31/02* | (2006.01) |
| *A47C 31/00* | (2006.01) |
| *B32B 5/04* | (2006.01) |
| *A41D 31/00* | (2006.01) |
| *A47C 31/10* | (2006.01) |
| *A47G 9/02* | (2006.01) |
| *B32B 27/36* | (2006.01) |
| *B32B 27/40* | (2006.01) |

(52) U.S. Cl.
CPC ............ *A47G 9/0253* (2013.01); *B32B 5/026* (2013.01); *B32B 5/04* (2013.01); *B32B 27/18* (2013.01); *B32B 27/36* (2013.01); *B32B 27/40* (2013.01); *D02G 3/443* (2013.01); *A41D 31/0027* (2013.01); *D10B 2201/20* (2013.01); *Y10T 442/40* (2015.04); *Y10T 442/488* (2015.04)

(58) Field of Classification Search
USPC .................................................. 428/920, 921
See application file for complete search history.

(56) References Cited

U.S. PATENT DOCUMENTS

| | | |
|---|---|---|
| 7,666,802 B2 | 2/2010 | Capwell |
| 2009/0075047 A1 | 3/2009 | Masuda et al. |
| 2010/0130085 A1 | 5/2010 | Yu |
| 2011/0262704 A1 | 10/2011 | Rock et al. |

FOREIGN PATENT DOCUMENTS

| | | |
|---|---|---|
| GB | 2 014 204 A | 8/1979 |
| WO | WO 99/35926 | 7/1999 |
| WO | WO 2009/055046 A1 | 4/2009 |
| WO | WO 2011/045673 A1 | 4/2011 |

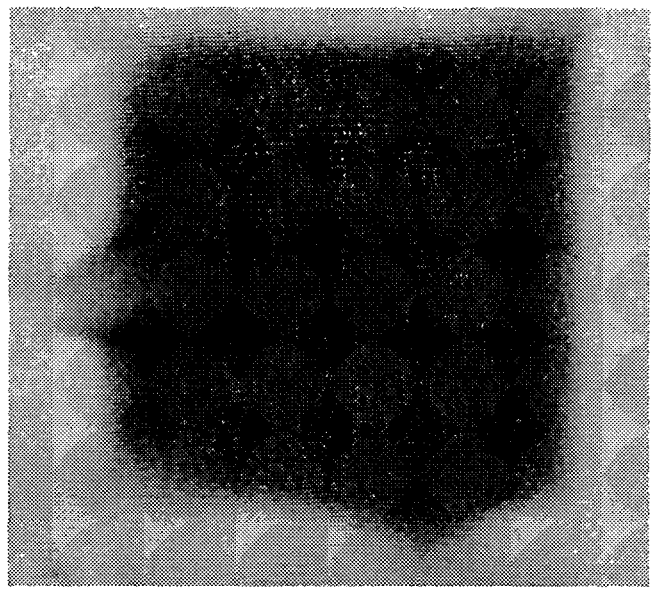

US 9,642,471 B2

FLAME-RETARDANT WATERPROOF STRETCHABLE COMPOSITE FABRIC, PILLOW OR MATTRESS PROTECTOR USING SAID FABRIC AND USE OF SAID FABRIC AS A PROTECTIVE SCREEN

This application is the U.S. National Phase Application of PCT/IB2013/000023, filed Jan. 8, 2013, which claims priority to European Patent Application No. E 12380001.3, filed Jan. 10, 2012, the contents of such applications being incorporated by reference herein.

FIELD OF THE INVENTION

The present invention relates to a flame-retardant, waterproof, stretchable composite fabric, comprising at least one knitted textile layer and one impervious layer joined, wherein the said at least two joined layers also giving a breathable article.

The multi-layered fabric of the invention is intended to be used in the manufacturing of flame barriers for different articles, such as mattresses, pillows, seats and upholstered furniture.

In this description both the terms flame-resistant and flame-retardant should be considered as synonyms.

BACKGROUND OF THE INVENTION

GB 2014204 A discloses a flame- and heat resistant pile fabric that comprises a base sheet made from flame-resistant and heat-resistant fibers, bearing on one or both faces a pile comprising yarn converted to a flame-resistant state and a flexible coating on the other face.

U.S. Pat. No. 4,513,042 A discloses a non-flammable sliver knit high pile fabric comprising a backing fabric that is knitted from a flame retardant aramid spun yarn and pile fabrics composed of a mixture of flame-retardant rayon fibres and super washed wool fibres and the back coating is constituted of a flame retardant composition. The fabric is especially useful in the manufacture of wearing apparel intended for use in extreme environments, such as fire fighting and cold weather military operations.

U.S. Pat. No. 7,666,802 B2 discloses a woven fabric composed of nylon or polyester fibres having both liquid barrier properties and fire-retardant properties without sacrificing many of the desirable properties of the fabric. In one embodiment the invention is also directed to a breathable nylon or polyester fabric having good fluid barrier characteristics and fire retardant properties. It includes a fluid saturated comprising a fire resistant oligomer and oil and water repellent composition impregnating the fabric and covering the surfaces and a layer of fire resistant polyurethane coating with halogen components covering at least one surface of the fabric. The fabric has a moisture vapour transmission rate of at least 600 g/m² and a hydrohead of at least 30 cm.

The multilayer fabric of this invention unlike what is explained in the cited GB 2014204 A and U.S. Pat. No. 4,513,042 A does not require a coating since the bonding between at least one knitted textile layer and one impervious layer is obtained by lamination; and it does not require a chemical flame-retardant treatment since it is flame-resistant inherently.

The multi-layered fabric of this invention has persistent flame-retardancy that does not disappear by washing (resistant to at least 50 washes at 92° C. according to UNE EN ISO 6330) or use and its textile layer is made of 100% cellulosic fabrics.

The multilayer fabric of the invention contains a textile layer made of 100% cellulosic fabrics and it is knitted instead of woven as in U.S. Pat. No. 7,666,802 B2. The multilayer fabric of the invention is halogen-free and its hydrohead-test results are also much superior to the ones reached in the cited document.

US 2009/0075047 A discloses flame resistant textile knit fabrics for use in mattresses and household products, particularly bed clothing products such as pillows, comforters, bed spreads, mattress covers and mattress pad ticking. The document discloses a fabric made of yarn comprising about 50% to about 80% by weight of inherently flame retardant viscose rayon fibre, about 10% to about 25% of modacrylic fibre and about 10% to about 25% by weights of cellulosic fibre. US 2009/0075047 A is a mono-layered product and it is not waterproof.

The textile layer of the multilayer fabric of the current invention is made of 100% cellulosic fabrics, instead of a maximum of 25% in the US 2009/0075047 A, has with regard to this antecedent a higher elastic recovery according to UNE 40-395 and it is a waterproof product, with at least 400 cm hydrohead.

EP 1413213 A1 discloses a waterproof, fireproof composite textile comprising a first textile layer with a thermostable fibre base, a second layer comprising a non-flammable membrane impermeable to liquid water and permeable to water vapour and a third discontinuous adhesive layer placed between said first and second layers securing the second layer on the first layer, wherein the face of the first layer comprises a net of raised yarns said yarns being at a distance from each other so as to enable the inclusion of an air volume between said first layer and a layer arranged opposite. The cited net of raised yarns determine that the cited composite textile is hardly extensible and many of the fibres used in the first textile layer such as polyamide, polyacrylate, copolymide are not thermostable at temperatures occurring in a fire or burning situation and they need to be fireproof treated.

WO 99/35926 A discloses a waterproof and thermal barrier material comprising a textile assembly including a shell fabric and a layer of a carrier fabric to which a polymer is adhered wherein the protection is provided by an air space within the assembly. Moreover the disclosed textile assembly does not provide a flame-retardant effect.

Both EP 1413213 A1 and WO 99/35926 A provide an air layer and are intended for fire fighter garments.

US 2011/262704 A1 discloses a composite fabric for use in safety apparel made of a plurality of joined layers comprising at least one textile layer made of inherent flame-resistant fibres, comprising a woven or knitted structure and one impervious layer joined by lamination using an adhesive. US 2011/262704 provides a flame-retardant waterproof stretchable composite fabric, suitable as a flame barrier for pillows or mattress protectors/encasements, made from a plurality of joined breathable layers comprising at least one textile layer and one impervious layer joined by lamination using an adhesive.

US 2010/130085 describes a flame retardant waterproof breathable composite fabric for upholstery comprising a frame retardant viscose knitted textile adhesively laminated on a polyurethane or polyester film.

The composite fabric of this invention comprises a knitted structure selected among Single Jersey or Interlock type providing a multidirectional extensibility and the impervious layer is of biaxial elastic condition, so that the multilayer stretchable fabric has at least 85% of elastic recovery in both fabric directions, according to UNE EN 15977, as well as taken a persistent flame-retardancy.

Moreover the composite fabric of this invention was specially intended to provide a flame barrier for pillows or mattresses including at least one textile layer providing in case of burning a carbonized layer that acts as a protective screen that safeguards mattresses and pillows.

SUMMARY OF THE INVENTION

The present invention provides a flame-retardant, waterproof, stretchable and breathable multi-layered fabric suitable as a flame barrier for different articles, such as mattresses, pillows, seats and upholstered furniture, made from a plurality of joined layers and comprising at least one textile layer and at least one impervious layer. The different layers are joined using any kind of adhesive system, being flame retardant or not. Preferably the bonding between the different layers is obtained by lamination.

The textile layer comprises any kind of knitted structure, preferably selected among Single Jersey or Interlock type, providing a multidirectional extensibility and is made of 100% cellulose fibres of natural renewable resources (preferably the majority, i.e. at least a 90% amount coming from wood or cotton), of which at least 50% and potentially up to 85% are cellulose flame-retardant fibres.

The WO 2011/045673 A discloses flame-retardant lyocell fibres, which include incorporated inorganic additives which are particularly suited for use in flame barriers for articles of manufacture, such as mattresses and upholstered furniture applications which can be used in the current invention.

The impervious layer may consist of a plastic material, preferably polyurethane or polyester incorporating a flame-retardant additive or a flame inhibitor.

Due to the fact that the flame-retardant additive/ingredient is mass incorporated in both the cellulose fibres of the knitted material and in the plastic material, the proposed multi-layered fabric obtained is a permanent flame-retardant product that fulfils completely the standards EN597, ISO12952 and BS7175. Therefore the flame-retardant characteristics do not disappear during washing, this meaning they are highly resistant to washing.

Moreover the final flame-retardant additive or flame inhibitor used in both the textile layer and impervious layer (incorporated in mass) is halogen free.

According to a preferred embodiment the flame-retardant waterproof stretchable composite fabric, of this invention, is obtained from a plurality of joined breathable layers comprising at least one textile layer and one impervious layer joined, wherein:
  the textile layer is made of 100% cellulose fibres of natural renewable resources, said cellulose fibres comprising at least 50% of cellulose flame-retardant fibres incorporating a known flame-inhibitor additive selected among Kaolin, calcium carbonate, aluminium hydroxide or an organic phosphorous-based pigment;
  the textile layer comprises a knitted structure selected among Single Jersey or Interlock type providing a multidirectional extensibility;
  the impervious layer is of biaxial elastic condition and comprises an halogen free plastic material selected among polyurethane or polyester incorporating a known flame inhibitor additive selected among organo-phosphorus compounds such as organophosphates, tris (2,3-dibromopropyl) phosphate, TPP, RDP, BPADP, tri-o-cresyl phosphate, phosphonates such as DMMP and phosphinates As per its structure and formulation the fabric has a persistent flame-retardancy and the multilayer stretchable fabric has at least 85% of elastic recovery in both fabric directions, according to UNE EN 15977.

Further the flame-retardant properties of said composite fabric preferred embodiment including one textile layer and one impervious layer are resistant to at least 50 washes at 92° C. according to UNE EN ISO 6330.

In a further embodiment of the invention the flame-retardant waterproof stretchable composite fabric comprises an impervious layer sandwiched between two textile layers with a structure as above disclosed.

As a consequence of the above provisions the fire-resistant multi-layered waterproof stretchable fabric here proposed is:
  a flame-resistant product that fulfils completely the standards EN597, ISO12952 and BS7175;
  permanent flame-resistant product, keeping the flame-retardant characteristics after multiple washes;
  waterproof with at least 300-400 $cm^2$ $H_2O$ hydrohead, according to UNE EN 20811,
  stretchable with at least 85% elastic recovery in both directions of the fabric, according to UNE EN 15977, and
  breathable with at least 200 $g/m^2 \cdot day$ breathability according to BS7209;
  weight from 80 to 350 $g/m^2$, i.e. lightweight article.

In an embodiment the fire-resistant multi-layered waterproof stretchable fabric has a weight of 140 to 180 $g/m^2$ or about 160 $g/m^2$.

The invention further refers to a pillow or mattress protector obtained using the previously disclosed fabric.

However this multilayer stretchable fabric can be used in the manufacturing of several further articles such as cushion protectors, featherbed protectors, duvet protectors and seat protectors.

The invention also refers to the use of at least one textile layer of knitted structure and comprising at least 50% of cellulose flame-retardant fibres in a multilayer fabric according to the above preferred embodiment, said composite fabric providing in case of burning a carbonized layer that acts as a protective screen that safeguards mattresses and pillows.

BRIEF DESCRIPTION OF THE DRAWINGS

FIG. 1 is a picture showing the after burning performance of the flame-retardant waterproof stretchable composite fabric of this invention, evidencing that no melt, no drip occurs since after burning the textile layer creates a carbonized layer that safeguards the mattress or pillow.

TEST RESULTS OF AN EMBODIMENT OF THE INVENTION

In the following the results of a test on ignability of a bedcover made using the flame-retardant fabric of this invention by smouldering and flaming ignition sources are detailed.

The flame-retardant fabric of the text comprises two layers: a knitted textile layer made of 100% cellulose fibres knitted in a Single Jersey structure (of about 120 $g/m^2$), 85% of them incorporating an organic phosphorous-based flame-inhibitor, laminated with a polyurethane impervious layer of 25 microns incorporating an organophosphorous flame-inhibitor.

The test follows Standard BS 7175:1989, Section 3. Individual bedcovers (including mattress cases and covers, sheets, pillows, blankets, bedspreads and continental quilt covers) tested with smouldering and flaming ignition sources.

Scope: Methods of assessing the ignitability of individual items of bedcovers. The ignition sources used are the smouldering and/or flaming ignition sources.

Equipment used: Chronometer, Test rig, Anemometer, Ruler.

Conditioning of specimens and cigarette: min 16 h, 20°±5° C. and 65%±5% hr

Results obtained:

| Ignition source | | Specified time | Behaviour at specified time | | Behaviour on dismanting | | Ignited/Not Ignited |
| --- | --- | --- | --- | --- | --- | --- | --- |
| Number | Position | | Initial | Repeat | Initial | Repeat | (I/NI) |
| 0 | A | 60 minutes after placement of the cigarette | 0 s | 0 s | No Progressive smouldering | No Progressive smouldering | NI |
| 0 | B | 60 minutes after placement of the cigarette | 0 s | 0 s | No Progressive smouldering | No Progressive smouldering | NI |
| 1 | A | 120 s after removal of the ignition flame | 0 s | 0 s | No Progressive smouldering | No Progressive smouldering | NI |
| 1 | B | 120 s after removal of the ignition flame | 0 s | 0 s | No Progressive smouldering | No Progressive smouldering | NI |
| 2 | A | 120 s after removal of the ignition flame | 8 s | 12 s | No Progressive smouldering | No Progressive smouldering | NI |
| 2 | B | 120 s after removal of the ignition flame | 0 s | 0 s | No Progressive smouldering | No Progressive smouldering | NI |
| 3 | A | 120 s after removal of the ignition flame | 9 s | 22 s | No Progressive smouldering | No Progressive smouldering | NI |
| 3 | B | 120 s after removal of the ignition flame | 0 s | 0 s | No Progressive smouldering | No Progressive smouldering | NI |
| 4 | A | 10 minutes after the ignition of the crib | 0 s | 0 s | No Progressive smouldering | No Progressive smouldering | NI |
| 4 | B | 10 minutes after the ignition of the crib | 0 s | 0 s | No Progressive smouldering | No Progressive smouldering | NI |
| 5 | A | 10 minutes after the ignition of the crib | 0 s | 0 s | No Progressive smouldering | No Progressive smouldering | NI |
| 5 | B | 10 minutes after the ignition of the crib | 0 s | 0 s | No Progressive smouldering | No Progressive smouldering | NI |
| 6 | A | 13 minutes after the ignition of the crib | 0 s | 0 s | No Progressive smouldering | No Progressive smouldering | NI |
| 6 | B | 13 minutes after the ignition of the crib | 0 s | 0 s | No Progressive smouldering | No Progressive smouldering | NI |
| 7 | A | 13 minutes after the ignition of the crib | 0 s | 0 s | No Progressive smouldering | No Progressive smouldering | NI |

-continued

| Ignition source | | Specified time | Behaviour at specified time | | Behaviour on dismanting | | Ignited/ Not Ignited |
|---|---|---|---|---|---|---|---|
| Number | Position | | Initial | Repeat | Initial | Repeat | (I/NI) |
| 7 | B | 13 minutes after the ignition of the crib | 0 s | 0 s | No Progressive smouldering | No Progressive smouldering | NI |

Test conditions:
Test atmosphere: (15-30° C.) and (55 ± 20% hr)
Pre-treatment: Null
Ignition source: Source 0 (smouldering cigarette) tested at Position A (Top) and Position B (Between top and $2^{nd}$ fold), Source 1, 2, 3 (Butane gas flame) tested at Position A (Top) and Position B (Below the overhang) and Source 4, 5, 6, 7 (Crib) at Position A (Top) and Position B (Below the overhang)
Type of gas: Butane
Exposure time of the source: Source 1: 20 ± 1 s
Source 2: 40 ± 1 s
Source 3: 70 ± 1 s
Flame height of the source: Source 1: 35 mm
Source 2: 145 mm
Source 3: 240 mm
Wind speed: <0.2 m/s
Remark: The results relate only to the ignitability of the test specimen under the particular conditions of the test and are not intended as a means assessing the full potential fire hazard of the bed covers in use.

The invention claimed is:

1. A flame-retardant waterproof stretchable composite fabric, suitable as a flame barrier for pillows or mattress protectors/encasements, made from a plurality of joined breathable layers comprising at least one textile layer and one impervious layer joined by lamination using an adhesive, wherein:
the at least one textile layer is made of 100% cellulose fibres, said cellulose fibres comprising at least 50% of cellulose flame-retardant fibres incorporating a flame-inhibitor additive;
the at least one textile layer comprises a knitted structure selected from Single Jersey or Interlock type providing a multidirectional extensibility;
wherein:
said flame-inhibitor additive is halogen free and selected from the group consisting of Kaolin, calcium carbonate, aluminium hydroxide or an organic phosphorous-based pigment;
the impervious layer is of biaxial elastic condition; and
the impervious layer comprises a halogen free plastic material selected from polyurethane or polyester incorporating an organophosphorus flame-inhibitor additive, wherein the stretchable composite fabric has at least 85% of elastic recovery in both fabric directions, according to UNE EN 15977 and the fabric takes a persistent flame-retardancy, as set forth in standards EN597, ISO12952 and BS7175.

2. A flame-retardant waterproof stretchable composite fabric, according to claim 1, wherein more than 90% of said 100% cellulose fibres are derived from wood or cotton.

3. A flame-retardant waterproof stretchable composite fabric, according to claim 2 wherein about 85% of said 100% cellulose fibres are cellulose flame-retardant fibres.

4. A flame-retardant waterproof stretchable composite fabric, according to claim 3, wherein it has a weight from 80 to 350 g/m$^2$.

5. A flame-retardant waterproof stretchable composite fabric, according to claim 4, wherein it has a weight of about 160 g/m$^2$ in a two layer structure.

6. A flame-retardant waterproof stretchable composite fabric according to claim 5, comprising two of the at least one textile three layers with said impervious layer sandwiched between the two textile layers.

7. A flame-retardant waterproof stretchable composite fabric, according to claim 2, wherein it has a weight from 80 to 350 g/m$^2$.

8. A flame-retardant waterproof stretchable composite fabric, according to claim 7, wherein it has a weight of about 160 g/m$^2$ in a two layer structure.

9. A flame-retardant waterproof stretchable composite fabric according to claim 8, comprising two of the at least one textile layers with said impervious layer sandwiched between the two textile layers.

10. A flame-retardant waterproof stretchable composite fabric, according to claim 1, wherein about 85% of said 100% cellulose fibres are cellulose flame-retardant fibres.

11. A flame-retardant waterproof stretchable composite fabric, according to claim 10, wherein it has a weight from 80 to 350 g/m$^2$.

12. A flame-retardant waterproof stretchable composite fabric, according to claim 11, wherein it has a weight of about 160 g/m$^2$ in a two layer structure.

13. A flame-retardant waterproof stretchable composite fabric according to claim 12, comprising two of the at least one textile layers with said impervious layer sandwiched between the two textile layers.

14. A flame-retardant waterproof stretchable composite fabric, according to claim 1, comprising two of the at least one textile layers with said impervious layer sandwiched between the two textile layers.

15. A flame-retardant waterproof stretchable composite fabric, according to claim 1, wherein the organophosphorus flame inhibitor additive is selected from the group consisting of:
tris-(2,3-dibromopropyl) phosphate,
triphenyl phosphate (TPP),
resorcinol bis(diphenylphosphate) (RDP),
bisphenol A diphenyl phosphate (BADP),
trio-o-cresyl phosphate,
dimethyl methyl phosphonate (DMMP), and
phosphinates.

16. A pillow or mattress protector obtained from a flame-retardant waterproof stretchable composite fabric made from a plurality of joined breathable layers comprising at least one textile layer and one impervious layer joined by lamination using an adhesive, wherein:

the at least one textile layer is made of 100% cellulose fibres, said cellulose fibres comprising at least 50% of cellulose flame-retardant fibres incorporating a flame-inhibitor additive;

the at least one textile layer comprises a knitted structure selected from Single Jersey or Interlock type providing a multidirectional extensibility, wherein:

said flame-inhibitor additive is halogen free and selected from the group consisting of Kaolin, calcium carbonate, aluminium hydroxide or an organic phosphorous-based pigment;

the impervious layer is of biaxial elastic condition; and the impervious layer comprises a halogen free plastic material selected from polyurethane or polyester incorporating an organophosphorus flame-inhibitor additive, wherein the stretchable composite fabric has at least 85% of elastic recovery in both fabric directions, according to UNE EN 15977 and the fabric takes a persistent flame-retardancy, as set forth in standards EN597, ISO12952 and BS7175.

17. A pillow or mattress protector according to claim 16, wherein the organophosphorus flame inhibitor additive is selected from the group consisting of:

tris-(2,3-dibromopropyl) phosphate,
triphenyl phosphate (TPP),
resorcinol bis(diphenylphosphate) (RDP),
bisphenol A diphenyl phosphate (BADP),
trio-o-cresyl phosphate,
dimethyl methyl phosphonate (DMMP), and
phosphinates.

* * * * *

UNITED STATES PATENT AND TRADEMARK OFFICE
CERTIFICATE OF CORRECTION

PATENT NO. : 9,642,471 B2
APPLICATION NO. : 14/350131
DATED : May 9, 2017
INVENTOR(S) : Joan Curós Santaeularia and Laura Rigau Roca Page 1 of 1

It is certified that error appears in the above-identified patent and that said Letters Patent is hereby corrected as shown below:

On the Title Page

(72) Inventors: First Inventor's address, delete "Olt" and insert -- Olot --.

References Cited, Foreign Patent Documents, delete "EP 1 412 213 A1 4/2004" and insert -- EP 1 413 213 A1 4/2004 --.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*